UNITED STATES PATENT OFFICE.

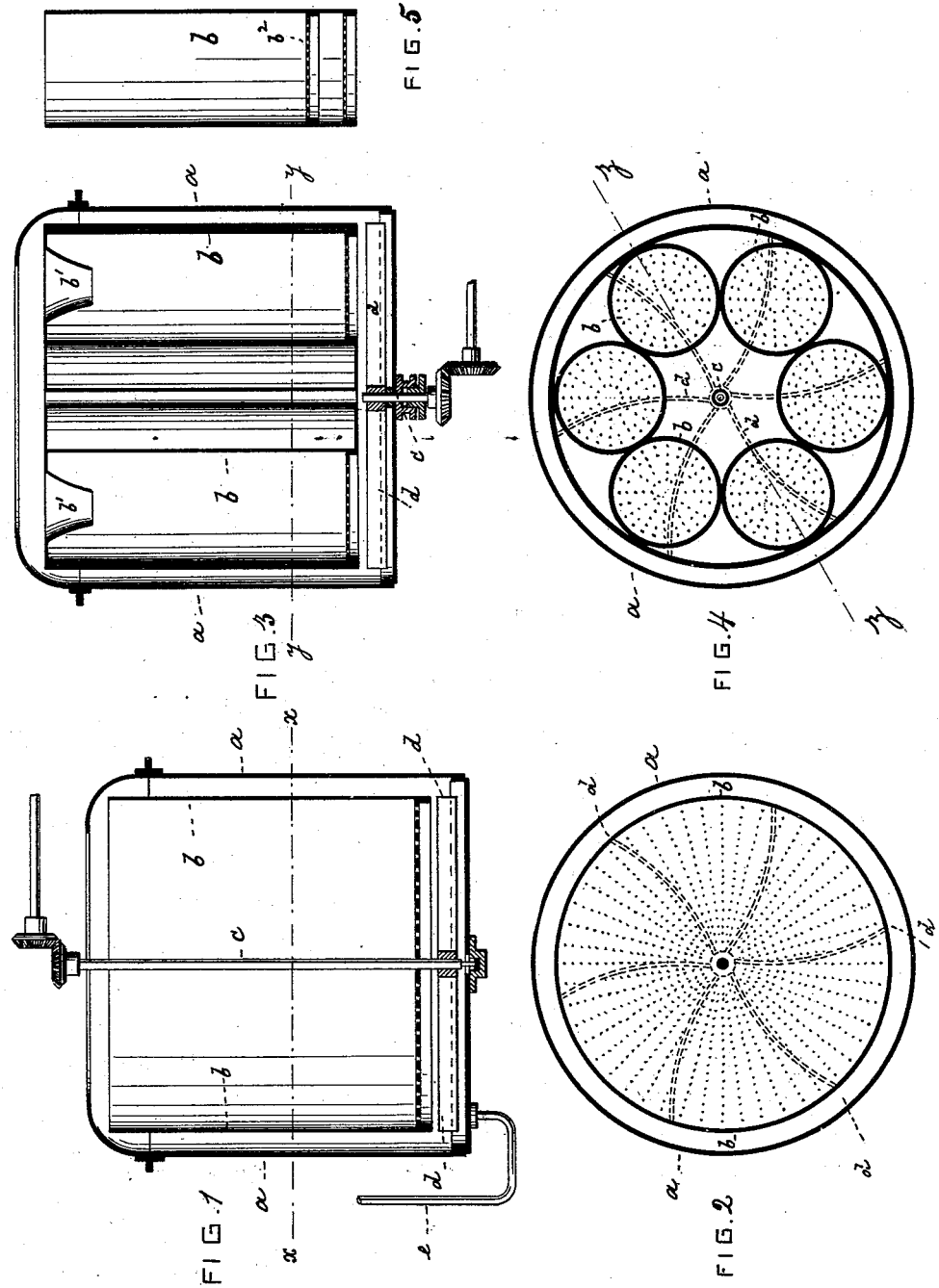

CARL AUGUST GOTTLIEB SCHMIDT, OF LANGENSALZA, PRUSSIA, GERMANY

DYE-VAT.

SPECIFICATION forming part of Letters Patent No. 425,703, dated April 15, 1890.

Application filed June 11, 1888. Serial No. 276,718. (No model.)

*To all whom it may concern:*

Be it known that I, CARL AUGUST GOTTLIEB SCHMIDT, of Langensalza, Germany, have invented an Improved Dyeing Apparatus, of which the following is a specification.

This invention relates to a dyeing apparatus of improved construction; and it consists in the various features of improvement more fully pointed out in the claim.

In the accompanying drawings, Figure 1 is a vertical central section of my improved dyeing apparatus. Fig. 2 is a horizontal section on line $x\ x$, Fig. 1. Fig. 3 is a vertical central section of a modification on line $z\ z$, Fig. 4; Fig. 4, a horizontal section on line $y\ y$, Fig. 3; and Fig. 5, a sectional elevation of a modification of vessel $b$.

With particular reference to Figs. 1 and 2, the letter $a$ represents an outer vessel, within which is secured an inner vessel $b$ in such a manner that a circulating-space remains between the two bottoms and also between the two walls of the vessels. The bottom of the vessel $b$ is perforated, as shown. Through the vessel $b$ there passes a shaft $c$, receiving motion by bevel-gear or otherwise and journaled in the bottom of vessel $a$. To this shaft there is secured between the two bottoms of vessels $a\ b$ a fan-wheel $d$. The wings of this fan-wheel extend outwardly radially from the center and revolve in a plane parallel to the two bottoms between which they are confined. The wings are preferably curved, as shown, and are of a length to reach about to the edge of vessel $b$. At the upper edge the vessel $a$ may be turned inward to guide the liquid into vessel $b$.

In use the textile or other fabric to be dyed, blued, sized, bleached, washed, or otherwise treated is placed into the inner vessel, the dyeing-liquid is admitted through a pipe $e$ into the apparatus, and the fan-wheel is set in motion. By the revolution of the fan-wheel the liquid between the wings of the same will be thrown outwardly, and thus a vacuum will be created around the shaft within the wheel. This vacuum does not only permit the liquid to percolate through the contents of vessel $b$, but it will with great force suck the liquid down through such contents. After the liquid has been thus drawn down a second function will be performed by the fan-wheel. By throwing the liquid forcibly outward it will cause the same to rise between the vessels $a\ b$ and to overflow into vessel $b$, thus completing the circulation. Thus it will be seen that the textile fabric is subjected to a continuous active circulation produced without the use of any heat or without the use of any pumps, tubes, connections, valves, or other intermediate mechanism.

In Figs. 3 and 4 I have shown a set or series of vessels $b$ placed within the outer vessel $a$ in lieu of the single vessel shown in Fig. 1. In this modification each vessel $b$ carries a funnel $b'$ at its top to guide the liquid. The shaft of the fan-wheel $d$ is driven from below in lieu of being driven from above. The contents of vessel $b$ may be separated or subdivided by one or more false bottoms $b^2$, such as shown in Fig. 5.

I claim as my invention—

In a dyeing apparatus, the combination of an outer vessel $a$ with an inner vessel $b$, having a perforated bottom and of a size to form a circulating-space below and around vessel $b$, a shaft passing into vessel $a$, and a fan-wheel secured to such shaft between the bottoms of vessels $a\ b$, the wings of the fan-wheel extending radially outward from the center, substantially as specified.

In testimony whereof I have signed my name to this specification in the presence of two subscribing witnesses.

CARL AUGUST GOTTLIEB SCHMIDT.

Witnesses:
 EDUARD PEITZ,
 B. ROI.